Aug. 8, 1961      R. G. BOITEN      2,995,034
LOAD-CELL DEVICES
Filed April 26, 1957

INVENTOR.
ROELF GEERT BOITEN
BY
ATTORNEY

2,995,034
LOAD-CELL DEVICES

Roelf Geert Boiten, Delft, Netherlands, assignor, by mesne assignments, to The Budd Company, Philadelphia, Pa., a corporation of Pennsylvania
Filed Apr. 26, 1957, Ser. No. 655,207
Claims priority, application Netherlands May 1, 1956
8 Claims. (Cl. 73—141)

This invention pertains to load-cell devices and particularly to spring element and loading means combination for use in the measurement of externally applied loads.

A load-cell may be defined as a device which yields a variable signal related in a known manner to the magnitude of an imposed external load. Such devices generally comprise a resilient spring element exhibiting areas which are strained in a known manner during proper application of an external load, a means for properly transmitting loads to the spring element, and transducer means for sensing spring element strains and generating a proportional output signal.

Various transducers for gauging spring element surface strains are known, however, the most convenient are the bonded resistance gauges and their use is contemplated with the devices of this invention.

The load cell spring element and its loading means should cooperate to produce gauged strains directly related to the magnitude of an external load and independent of the position and direction of the line of action of the load application.

Conventional load-cell designs include the axially loaded column whose length-to-diameter ratio must be large in order to obviate side and skew loading errors and the bending beam spring element whose deformation underload is a bending which may be independent of loading errors only when load application is restricted to a line segment paralleling the neutral axis of the beam.

Therefore, it is an object of this invention to provide an improved load-cell spring element and loading means combination which has a minimum length-to-diameter ratio and which generates gauge strains directly related to the magnitude of external loads with substantially reduced dependence upon direction and position of load application.

Briefly stated, the load-cell spring element and loading combination of this invention comprises a resilient plate shaped symmetrically about a normal axis, a first loading means contacting one side of the plate at a first group of more than two areas symmetrically spaced from and about the normal axis, and a second loading means contacting the opposite side of the plate at a second group of more than two areas symmetrically spaced from and about the normal axis and symmetrically angularly spaced between the areas of the first group. Preferably, the plate is of an angular configuration and the loading means comprise spherical bearings oriented in shallow depressions formed in the plate. External loads are received and transmitted to the bearings by first and second relatively rigid pressure plates.

Further objects and advantages will appear upon consideration of the following further explanation in conjunction with the accompanying drawing in which.

Figure 1:
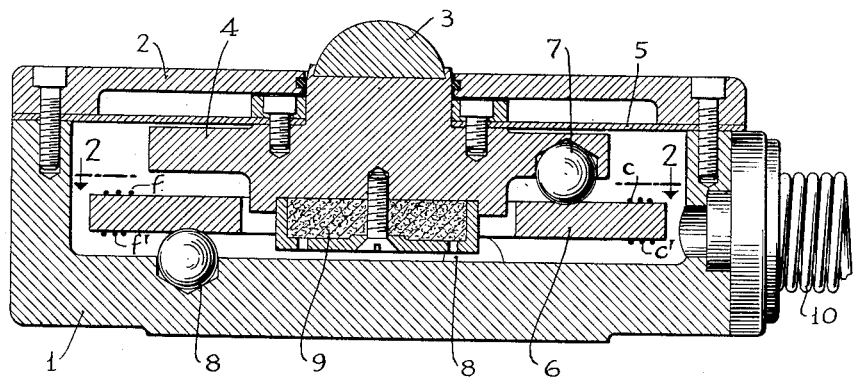
FIG. 1 is a cross-section of a load-cell incorporating a spring element and loading means combination according to this invention.

With particular reference to FIG. 1, the preferred load-cell embodiment of this invention comprises a rigid pressure plate 1 which may be integrally extended to form a side wall portion of the load-cell housing. The external housing is completed by cover plate 2. An upper pressure plate is illustrated as including a hemispherical segment 3 and a generally cylindrical segment 4. Hermetic sealing is provided by flexible diagram 5.

The resilient spring element of the load-cell is, preferably, an annular ring 6 having a normal axis of symmetry. External loading is transferred from pressure plates 1 and 4 to spring element 6 by means of upper and lower sets of spherical bearings, represented at 7 and 8 respectively.

Auxiliary elements may include a moisture absorbing means 9 and a connector 10 for interconnection of strain sensing transducers and external circuitry (not shown).

Figure 2:
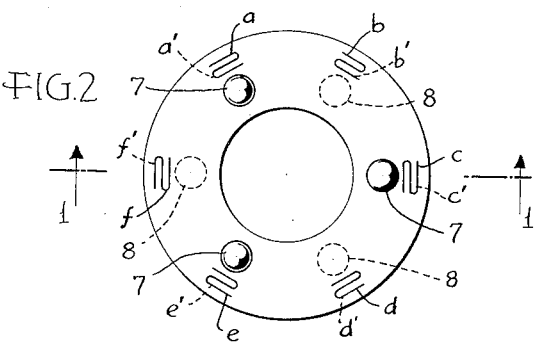
FIG. 2 is a plan view of the preferred annular spring element and spherical bearing loading means of this invention illustrating gauge strain transducer application.

As seen more clearly in FIG. 2, the bearings 7 of the upper loading means and 8 of the lower loading means are spaced equidistantly from, and equiangularly about, the normal axis of annular plate 6. Further, the relative angular orientation of the sets of bearings is symmetrical, with each bearing of one set being located arcuately midway between adjacent bearings of the other set.

Due to the above specified loading means, the sum total of bending moments applied to spring element 6 is independent of the division of axial loads among the loading elements and, for a given embodiment, the sum of the bending moments depends only upon the magnitude of the external load. It follows that resilient element 6 will be deformed in proportion to the applied bending moments and will exhibit surface strains directly related thereto. Hence, spring element surface strains may be sensed and summed by means of conventional strain transducers, the bonded resistance strain gauges $a$ to $f$ and $a'$ to $f'$, for example. Repeated laboratory experiments have established that summations of strain measurements at the surfaces of spring element 6 are independent of the location on pressure plates 1 and 4 of the intersection of the line of application of the external load to be measured.

A convenient strain gauge array is illustrated schematically in FIG. 2. On both surfaces of spring element 6, strain gauges $a$ to $f$ and $a'$ to $f'$ are bonded tangentially and symmetrically of radii extending centrally through the contact areas of the loading means 7 and 8. The primes indicate strain gauges bonded to the lower surface of spring element 6, at the same radial positions as the corresponding upper surface gauges. Assuming the load-cell to be subjected to a compression load, gauges $a$, $c$, $e$, and $b'$, $d'$, and $f'$ will sense a compression surface deformation and the remaining gauges will sense a tensile surface deformation. The sum of the compression strains, only, or of the tensile strains would be sufficient for indication of the axial load to be measured. However, as is conventional in the strain gauge art, the tensile and compression sensing gauges may be interconnected in a network to yield improved outputs independently of temperature effects.

Figure 3:
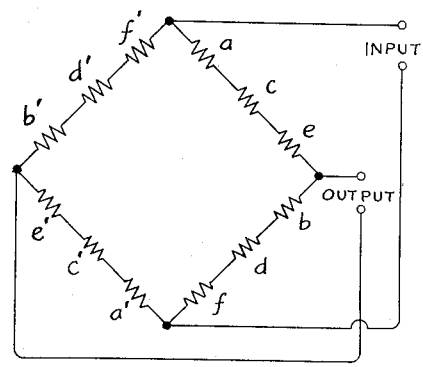
FIG. 3 illustrates a bridge network for generating output signals proportional to loading deformations of the spring element.

An example of the circuit connection of the sensing strain gauges is given in FIG. 3. The bridge network includes: a first arm comprised of gauges $a$, $c$, and $e$, in series; a second arm comprised of gauges $b$, $d$, and $f$, in series; a third arm comprised of gauges $a'$, $c'$, and $e'$, in series; and a fourth arm comprised of gauges $b'$, $d'$ and $f'$, in series. Temperature strains produce the same effect upon each of the bridge arms, and hence no output variation, while load strains affect the ratio arms oppositely to produce a doubled effect upon the bridge output.

While a preferred embodiment, along with exemplary auxiliary apparatus, has been specifically illustrated and described, it will be obvious to those skilled in the art that various modifications and substitutions may be made therein without departing from the invention. For example, while the numbers of contact areas per supporting means should not be less than three, these numbers may be increased where desired, so long as symmetry about the normal axis is preserved. It is, therefore, aimed in the appended claims to cover all such changes and modifications as fall within the true spirit and scope of the invention.

What is claimed is:

1. In a force measuring device, a load cell comprising a housing, a resilient annular disc, at least three supporting elements in the bottom of said housing and on which said disc is mounted, said elements being equally spaced around the axis of said disc, a pressure plate above said disc, at least three loading elements separating said plate and said disc and spaced equally from said axis and symmetrically between said supporting elements.

2. A load cell according to claim 1 wherein each said loading element is spaced at the mid-point of the arc length between said supporting elements.

3. A load cell according to claim 1 wherein said loading and supporting elements comprise steel spheres.

4. A load cell device for producing gauge strains precisely related to the magnitude of an applied load which combination comprises a resilient spring element plate having a normal axis of symmetry and having a diameter to thickness ratio substantially greater than one, a first loading means contacting one side of said plate at a first group of more than two areas spaced apart symmetrically about said axis, and a second loading means contacting the opposite side of said plate at a second group of more than two areas spaced apart symmetrically about said axis, each area of one of said groups being located angularly mid-way between two adjacent areas of the other of said groups.

5. The load cell combination of claim 4 wherein said plate is an annular ring.

6. The load cell combination of claim 5 wherein all of said areas of said groups are radially equidistant from said axis.

7. The load cell combination of claim 6 wherein the number of areas of one said group is equal to the number of areas of the other said group.

8. The load cell combination of claim 7 wherein each said means includes spherical bearings, and each said area is a contact area between one of said bearings and said plate.

References Cited in the file of this patent

UNITED STATES PATENTS

| | | |
|---|---|---|
| 1,972,578 | Wallichs et al. | Sept. 4, 1934 |
| 2,090,188 | Dahlstrom | Aug. 17, 1937 |
| 2,319,299 | Converse | May 18, 1943 |
| 2,439,146 | Ruge | Apr. 6, 1948 |
| 2,458,481 | Ruge | Jan. 4, 1949 |
| 2,488,347 | Thurston | Nov. 15, 1949 |

FOREIGN PATENTS

| | | |
|---|---|---|
| 468,026 | Canada | Sept. 11, 1950 |